UNITED STATES PATENT OFFICE.

JOHANNES JANSEN AND WILHELM NEELMEIER, OF LEVERKUSEN, NEAR COLOGNE GERMANY, ASSIGNORS TO FARBENFABRIKEN VORM. FRIEDR. BAYER & CO., OF ELBERFELD, GERMANY, A CORPORATION OF GERMANY.

AZO DYE.

981,276.   Specification of Letters Patent.   Patented Jan. 10, 1911.

No Drawing.   Application filed August 24, 1910. Serial No. 578,606.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in Dyes, of which the following is a specification.

Our invention relates to the manufacture and production of new azo coloring matters capable of dyeing on a mordant.

The new dyestuffs are obtained by combining the diazo compounds of such ortho-aminophenol derivatives which contain either nitro groups or halogens or both nitro groups and halogens but no sulfonic or carboxylic groups with diaminodiphenylether carboxylic acids.

The new products possess the valuable property that they can be dyed on wool together with bichromate in the same bath. They can also be dyed on a chrome mordant or according to the after-chroming method. The dyeing in one bath is best done by adding the dye with the bichromate to the bath, entering the wool, boiling, adding acetic acid in small portions and boiling again.

The new dyestuffs are brown to dark brown powders soluble in water generally with an orange-red color, and soluble in concentrated sulfuric acid generally with a red color. They yield upon reduction with stannous chlorid and hydrochloric acid an aminophenol derivative and a triaminodiphenylether carboxylic acid.

In carrying out our new process practically we can proceed as follows, the parts being by weight:—

Example: 18.85 parts of 6-chloro-4-nitro-2-aminophenol are diazotized at 8–10° C. by means of 15 parts of hydrochloric acid (19.5° Bé.) and 7 parts of sodium nitrite. The diazo compound is then added to an aqueous solution, which has to be stirred, until the combination is finished, of 24 parts of 2.4-diaminodiphenylether-4$^1$-carboxylic acid (melting point 190° C.) containing 25 parts of sodium carbonate. The dyestuff is precipitated with common salt. It is filtered off, pressed and dried. It is a brown powder which is soluble in water with an orange-red color and which is soluble in concentrated sulfuric acid with a red color. By reduction with stannous chlorid and hydrochloric acid 6-chloro-2.4-diaminophenol and 2.4.5-triaminodiphenylether-4$^1$-carboxylic acid are obtained. It dyes wool according to the above described method yellow-brown shades of good fastness to fulling and to light. The process is carried out in an analogous manner on starting from other ethers, such as 2.4-diaminodiphenylether-3$^1$-carboxylic acid (melting point 225° C.). Other ortho-aminophenol derivatives may be used, such as 4-chloro-2-aminophenol, 4.6-dichloro-2-aminophenol, 4-nitro-2-aminophenol, 5-nitro-2-aminophenol, picramic acid, 4-chloro-5-nitro-2-aminophenol, 6-nitro-4-chloro-2-aminophenol, 4-methyl-6-nitro-2-aminophenol, 2.4-dinitro-3-methyl-6-aminophenol, etc.

We claim:—

1. The herein described new azo dyestuffs obtainable from ortho-aminophenol substances and diaminodiphenylether carboxylic acids which dyestuffs are after being dried and pulverized brown powders soluble in water generally with an orange color, soluble in concentrated sulfuric acid generally with a red color; yielding upon reduction with stannous chlorid and hydrochloric acid ortho-aminophenol derivatives and triaminodiphenylether carboxylic acids; and dyeing wool together with bichromate and acid in the same bath brown shades, substantially as described.

2. The herein described new azo dyestuff obtainable from 6-chloro-4-nitro-2-aminophenol and 2.4-diaminodiphenylether-4$^1$-carboxylic acid, which dyestuff is, after being dried and pulverized, a brown powder soluble in water with an orange color and soluble in concentrated sulfuric acid with a red color; yielding upon reduction with stannous chlorid and hydrochloric acid 6-chloro-2.4-diaminophenol and 2.4.5-triaminodiphenylether-4$^1$-carboxylic acid; and dyeing wool together with bichromate and acid in the same bath brown shades fast to fulling and to light, substantially as described.

In testimony whereof we have hereunto set our hands in the presence of two subscribing witnesses.

JOHANNES JANSEN. [L. S.]
  WILHELM NEELMEIER. [L. S.]

Witnesses:
 CHAS. J. WRIGHT,
 ALFRED HENKEL.